Jan. 11, 1966 B. HOWARD 3,228,510

VARIABLE FULCRUM SELECTOR LEVER MECHANISM FOR PRINTER

Filed June 14, 1963 7 Sheets-Sheet 1

INVENTOR.
BERNARD HOWARD

BY James and Franklin

ATTORNEYS

VARIABLE FULCRUM SELECTOR LEVER MECHANISM FOR PRINTER

Filed June 14, 1963 7 Sheets-Sheet 2

INVENTOR.
BERNARD HOWARD
BY James and Franklin
ATTORNEYS

Jan. 11, 1966 B. HOWARD 3,228,510

VARIABLE FULCRUM SELECTOR LEVER MECHANISM FOR PRINTER

Filed June 14, 1963 7 Sheets-Sheet 3

INVENTOR.
BERNARD HOWARD

BY James and Franklin

ATTORNEYS

INVENTOR.
BERNARD HOWARD
BY James and Franklin
ATTORNEYS

Jan. 11, 1966 B. HOWARD 3,228,510

VARIABLE FULCRUM SELECTOR LEVER MECHANISM FOR PRINTER

Filed June 14, 1963 7 Sheets-Sheet 5

INVENTOR.
BERNARD HOWARD

BY James and Franklin
ATTORNEYS

VARIABLE FULCRUM SELECTOR LEVER MECHANISM FOR PRINTER

Filed June 14, 1963 7 Sheets-Sheet 6

INVENTOR.
BERNARD HOWARD

BY James and Franklin

ATTORNEYS

VARIABLE FULCRUM SELECTOR LEVER MECHANISM FOR PRINTER

INVENTOR.
BERNARD HOWARD

BY James and Franklin

ATTORNEYS

3,228,510
VARIABLE FULCRUM SELECTOR LEVER MECHANISM FOR PRINTER

Bernard Howard, Upper Saddle River, N.J., assignor to Mite Corporation, New Haven, Conn., a corporation of Delaware Filed June 14, 1963, Ser. No. 288,045
31 Claims. (Cl. 197—49)

This invention relates to printers, especially electrically controlled printers, and more particularly to selector mechanism for the same.

One object of the invention is to provide mechanism for poistioning a movable body which may require considerable force, but under control by a signal of very low power. The displacement or excursion may be considerable, and yet high speed movement with maximum efficiency are obtainable because the motion may be made a harmonic motion.

As preferred and here illustrated, the body is the type body of a printer, and is moved for character selection. Heretofore, the motion has been a combination of smaller motions. For example displacements of ⅛ and ¼ and ½ inch have been used in various combinations to obtain egiht positions in a range of 1″. In accordance with the present invention the entire motion is obtained directly, for which purpose a selector lever is oscillated by motor means, and any one of a number of fulcrum pins along the lever is movable into its path to produce a desired motion. The illustrated lever produces ten positions over a range of 1¼ inches.

Further objects of the invention are to increase the speed of operation and to eliminate the need for the lever going back to a home position after each character selection. For this purpose I employ a pair of levers which are oppositely effective, and it is only the differential of the movements of the two levers that is applied to the type body. One character selection is obtained in each swing of the pair of levers in only one direction, and the type body moves only the minimum amount needed to go directly from one selected character to the next.

A further object of the invention is to apply it to a cylindrical type body, and for this purpose there are two pairs of levers, one for rotary selection, and the other for axial selection. The same motor driven cams may be used for both pairs of levers. The axial selection may be combined with a step by step movement across the page.

To accomplish the foregoing general objects, and other more specific objects which will hereinafter appear, my invention resides in the selector and printer elements, and their relation one to another, as are hereinafter more particularly described in the following specification. The specification is accompanied by drawings in which.

Figure 6:
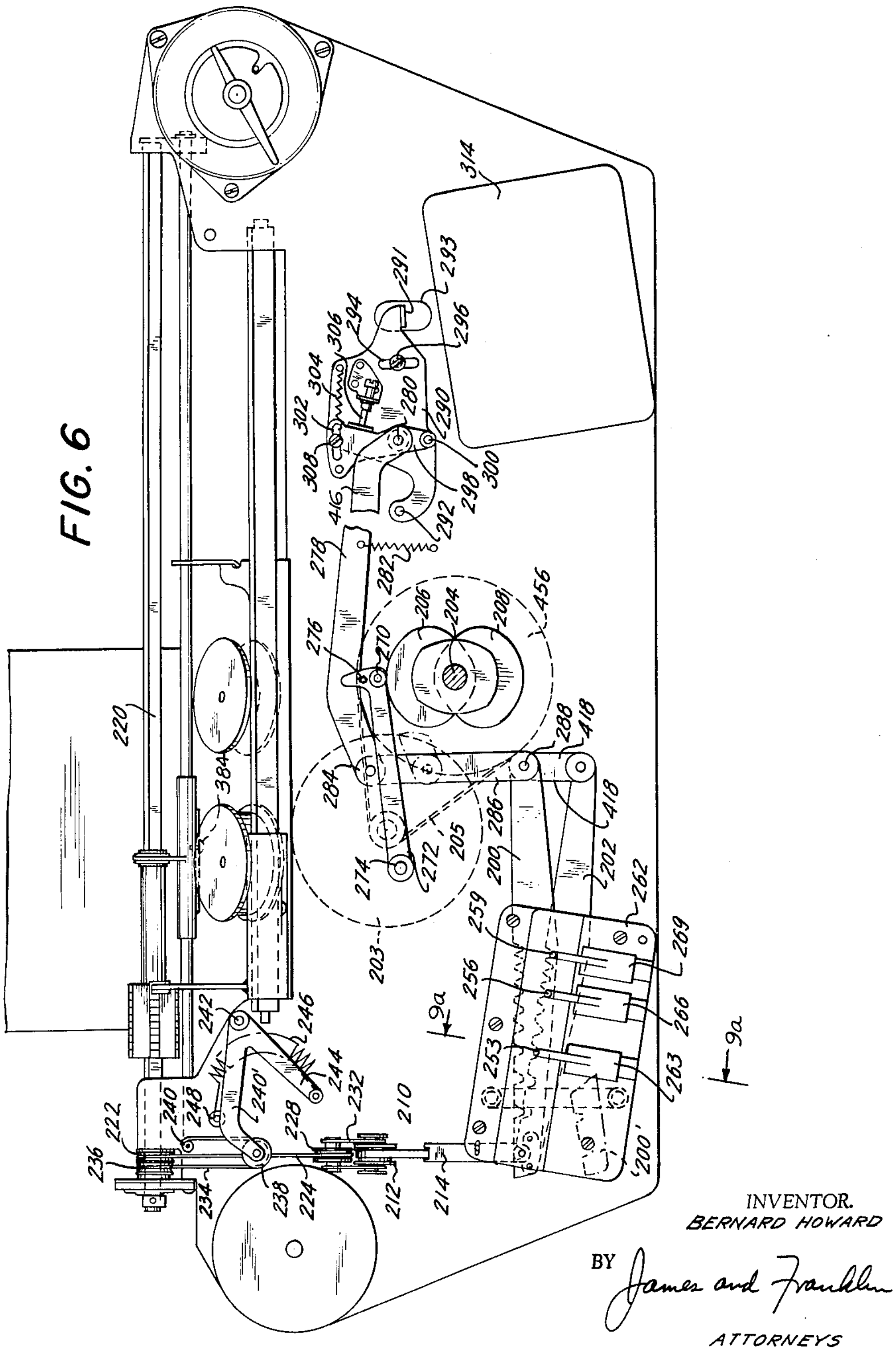
FIG. 6 is a front elevation of selector mechanism in a different form, for rotary selection, the axial selection levers being omitted to simplify the drawing.
Figure 7:
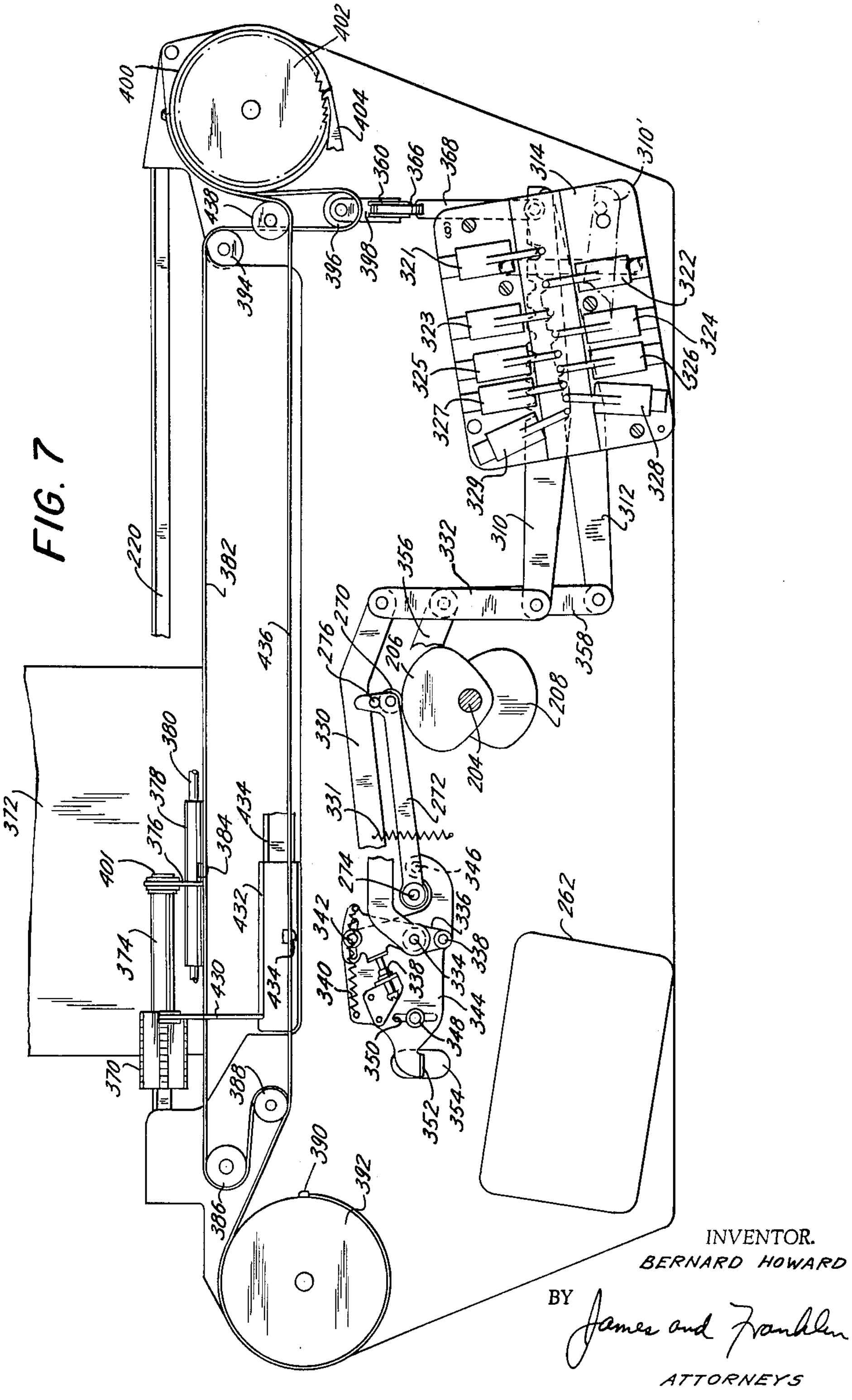
FIG. 7 is a similar front elevation showing the mechanism for axial selection, the rotary selection levers being omitted.
Figures 8, 8A:
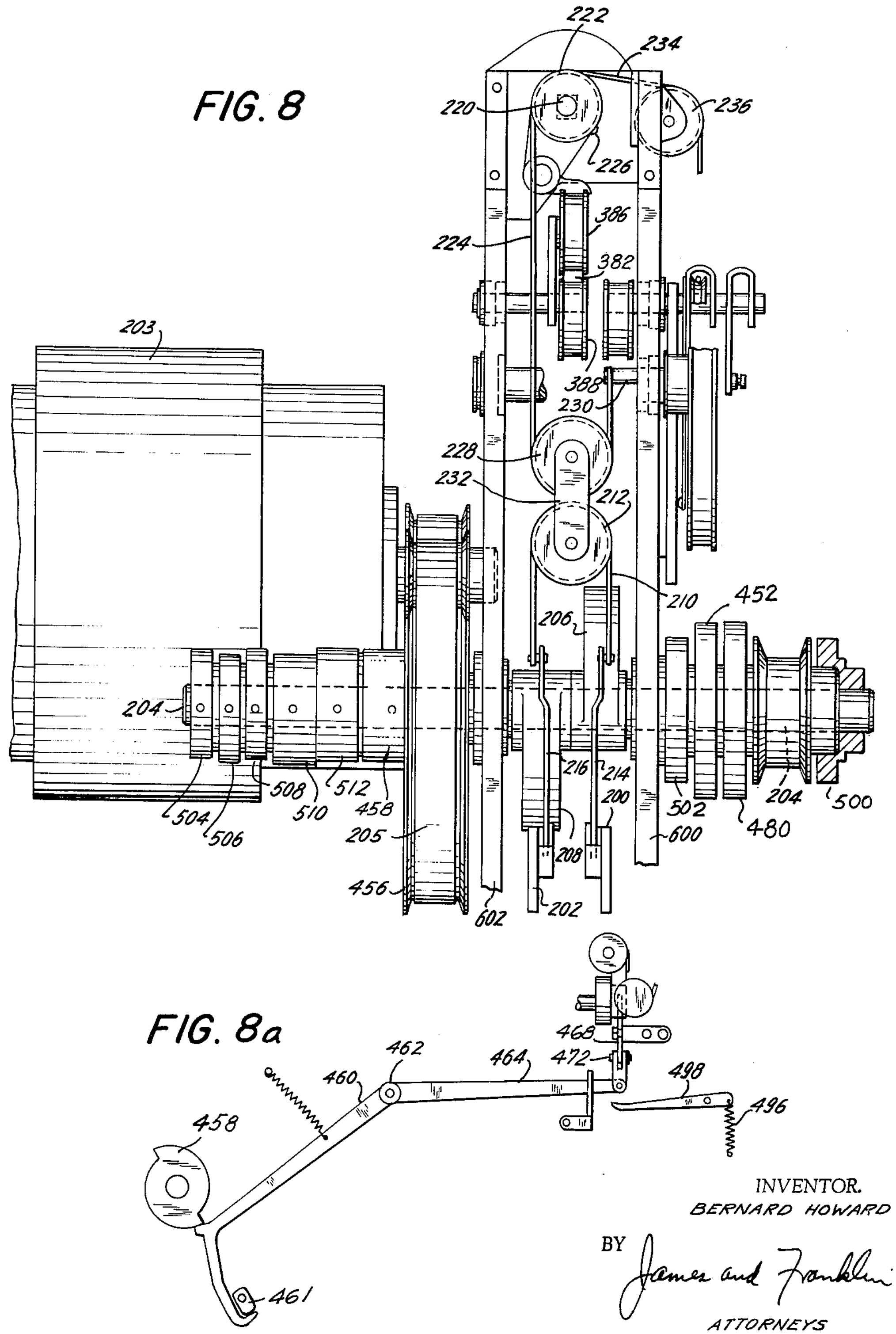
FIG. 8 is an end elevation looking toward the left of FIGS. 6 and 7.
Figures 9, 9A:
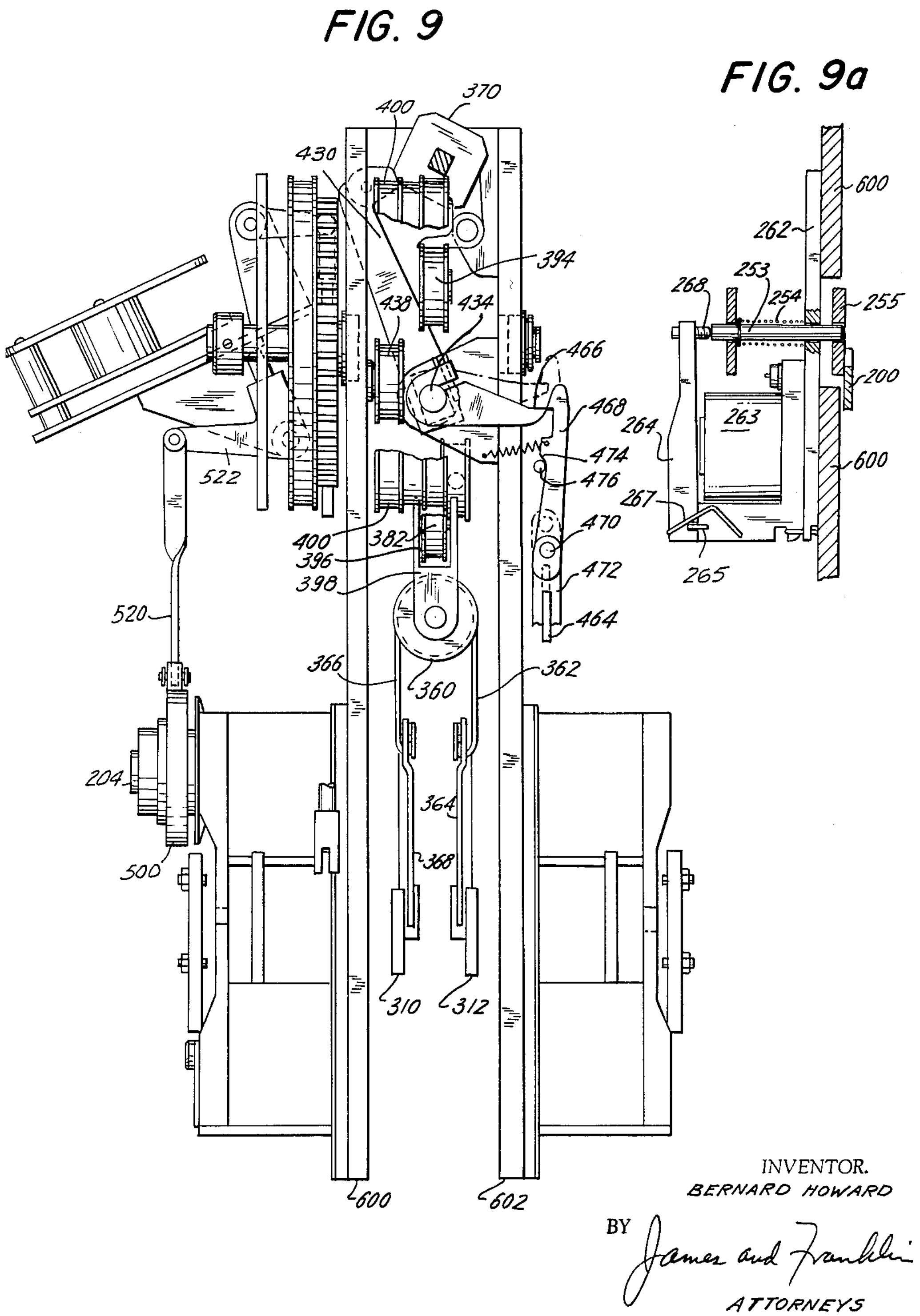
Figures 10, 11, 12:
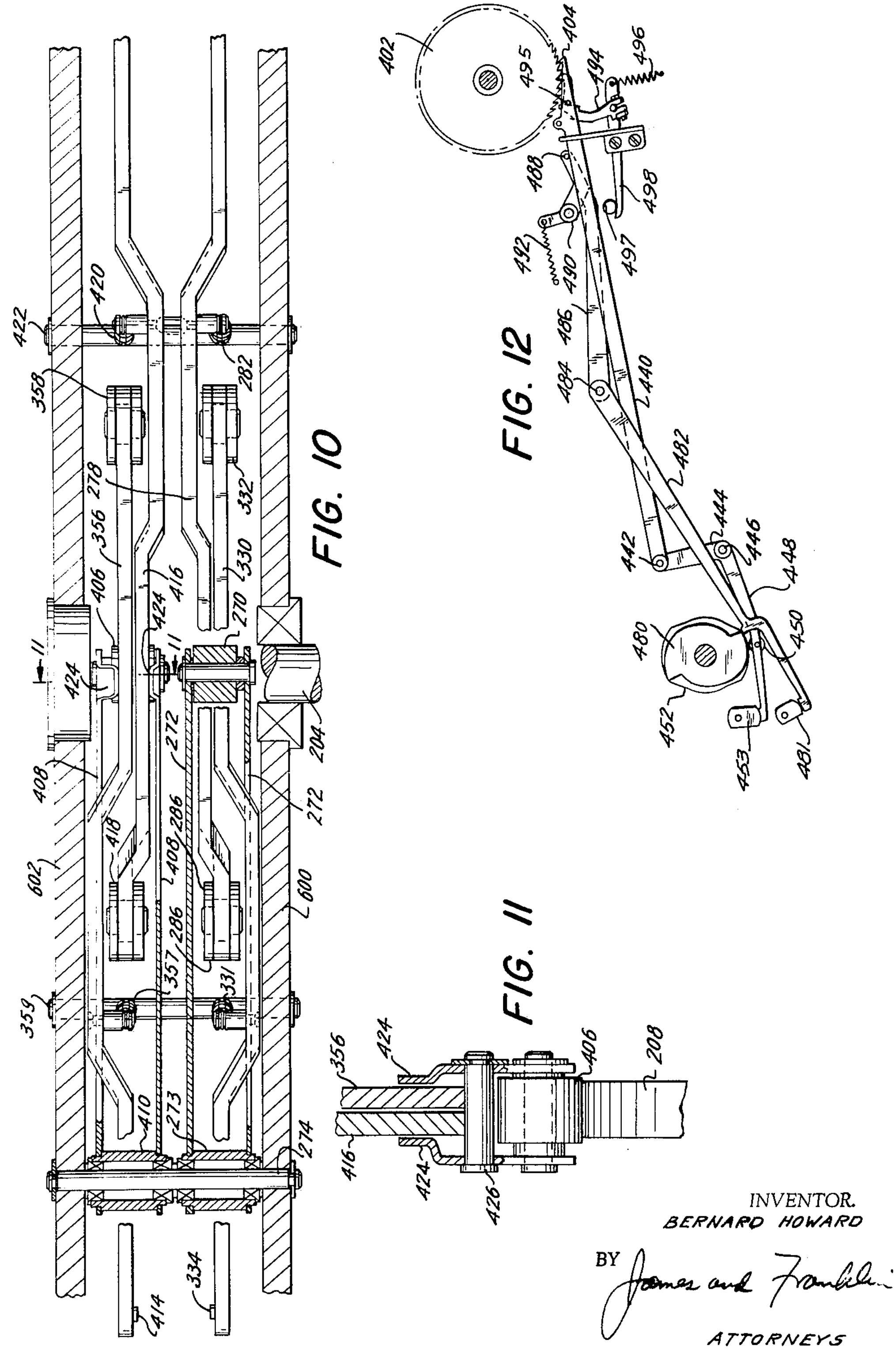

FIG. 8*a* is explanatory of the hammer action;

FIG. 9 is an end elevation looking toward the right of FIGS. 6 and 7;

FIG. 9*a* is a section through one of the selector magnets, taken approximately in the plane of the line 9*a*—9*a* in FIG. 6;

FIG. 10 is a partially sectioned horizontal view explanatory of certain intermediate levers used in FIGS. 6 and 7;

FIG. 11 is a fragmentary section taken in the plane of the line 11—11 of FIG. 10; and FIG. 12 is a front elevation of linkage used for character advance and carriage return, this linkage being omitted in FIGS. 6 and 7 to simplify the drawing.

Figure 2:
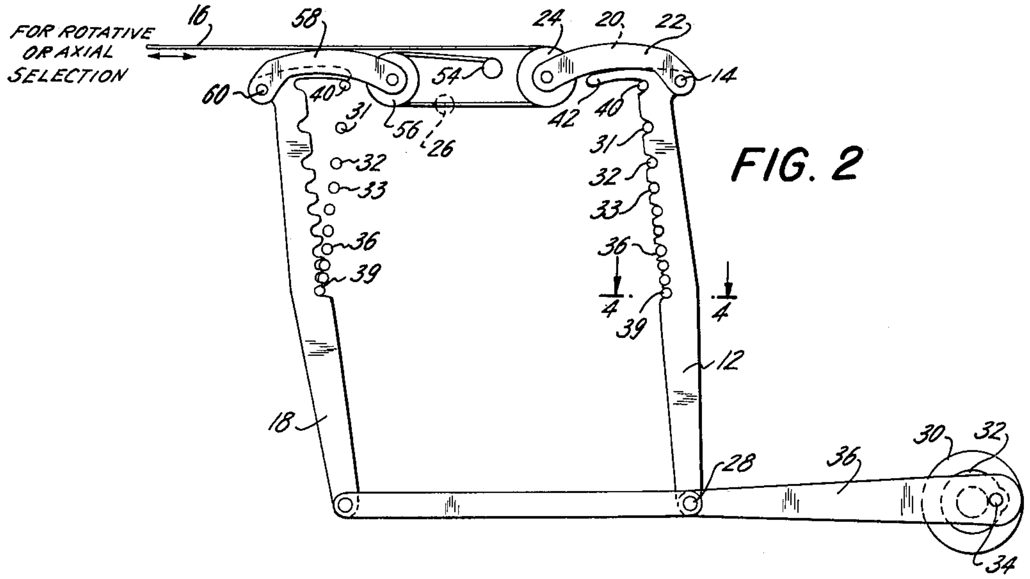
FIG. 2 is an elevation explanatory of the operation.

Referring to the drawing, and more particularly to FIG. 2, the mechanism comprises a selector lever 12 connected at the end 14 to a body, not shown, by means of a cable 16. For purpose of the present description the lever 18 is to be disregarded, and the situation is as though the cable 16 were secured at about the point 20 on link 22 for direct movement by lever 12, or alternatively, as though cable 16 were passed around pulley 24 as shown, but then secured at a fixed point 26 (with a distance or motion change of two to one, compared to direct attachment at point 20).

The other or lower end of lever 12 is connected at 28 to any suitable motor means to oscillate the same. In the present case a reduction motor 30 turns a crank disc 32 having a crank pin 34 carrying link 36 which extends to the pivot 28 of selector lever 12.

There are a plurality of fulcrum pins 31 through 39 which are movable into or out of the path of the lever 12, and a plurality of means to move the pins, so that operation of one of said means produces a corresponding position of the lever 12 and cable 16. A fixed fulcrum pin 40 may be located at the upper end of the lever, this pin corresponding to the home position of the lever when none of the fulcrum pins 31–39 are in use, and in such case the lever 12 swings idly back and forth at its lower end, without any accompanying motion of cable 16. For this purpose the pin 40 and pivot 14 are preferably in horizontal alignment, and pulley 24 is preferably on the same line.

It may be noted that the relative spacing of the fulcrum pins 31–39 is non-uniform, and this spacing is so selected along the lever that the increments of motion at the upper end of the lever are uniform. In the present case there are nine fulcrum pins, which together with the home position, provide ten positions of cable 16. The edge of the lever which bears against the fulcrum pins is preferably notched, thereby more accurately fixing the relative location of the lever and each fulcrum pin when in use, but theoretically the notches are not essential if the lever is fixed against longitudinal movement in some other fashion. There is a substantially horizontal but slightly arcuate extension of the lever at 42, which cooperates slidably with the fixed pin 40, but this is not needed when, as here, the cable 16 is assumed to be spring loaded.

Figure 3:
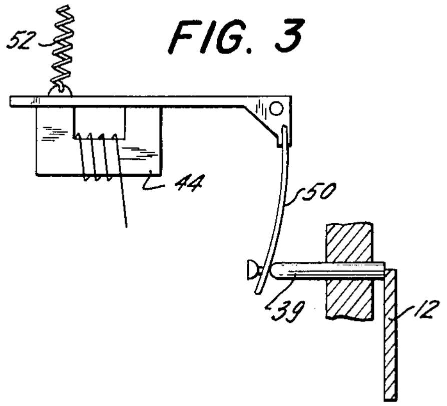
FIGS. 3, 4 and 5 are schematic horizontal sections drawn to enlarged scale and taken approximately in the plane of the line 4—4 of FIG. 2.
Figure 4:
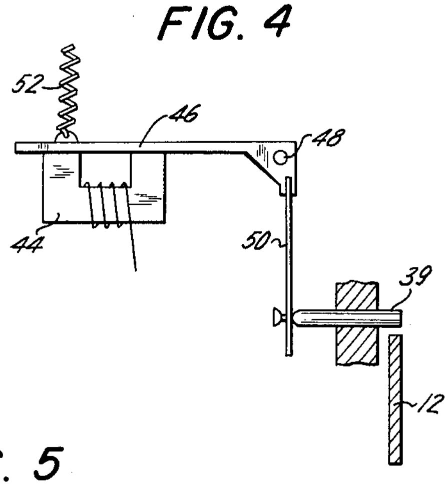
Figure 5:
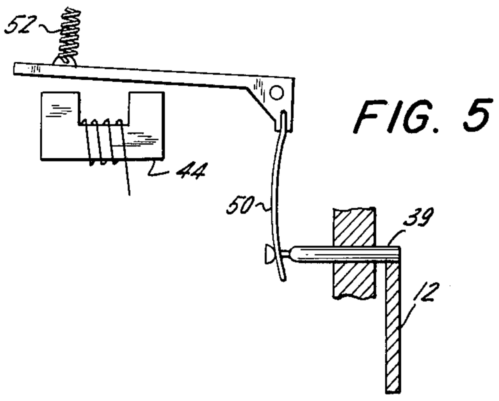

The fulcrum pins are preferably electrically controlled, as by the use of electro magnetic means. Referring to FIG. 4 the fulcrum pin 39 has been moved in front of lever 12 by energization of a magnet 44, the latter attracting an armature 46 which is pivoted at 48 and which has leaf spring 50 connected to fulcrum pin 39. The pin is normally retracted by means of a pull spring 52. The advantage of using a leaf spring 50 for one arm of the angle lever may be explained with reference to FIGS. 3 and 5 of the drawing. FIG. 3 shows that energization of magnet 44 while lever 12 is in forward position would do no harm because of yielding of spring 50. Conversely, FIG. 5 shows that premature deenergization of magnet 44 and the action of pull spring 52 while selector lever 12 is bearing against pin 39 does no harm because the lever itself holds the pin while spring 50 yields. This advantage will be apparent when describing the use of oppositely effective paired levers.

Reverting to FIG. 2, the motor 30 and crank 34 move another selector lever 18 along with selector lever 12, and the two levers are differentially connected to cable 16. In the present case the cable end is secured to a post 54, and passes around a pulley 56 carried by a link 58 pivoted at 60 on the upper end of lever 18. The cable then passes in opposite direction around pulley 24. A movement to the right of lever 12 shortens the cable, while a movement to the right of lever 18 lengthens the cable, and thus the levers are oppositely effective, even though they are driven back and forth in the same direction at their lower ends. Both levers have the same number and spacing of fulcrum pins 31–39; the same though oppositely facing notches on the lever; and the same fixed pin 40 corresponding to the home position. The location of the pins 31–39 corresponds to the retracted position of the lever. The magnets of the two like numbered fulcrum pins are energized simultaneously, as by means of a parallel or series electrical connection. Thus in the position shown in FIG. 2 the two fulcrum pins 39 are projected. Lever 12 is in home position because its lower end has been retracted by crank 14. Lever 18 is in maximum displacement at its upper end because it has been pulled by crank 34 about fulcrum 39. The cable 16 then is in shortest position.

On deenergization of the magnets of pins 39, the pin of lever 12 is readily retracted even if the pin of lever 18 is restrained by frictional pressure. On energization of different fulcrum pins, say the pins 36, they are readily advanced, and when crank 34 turns 180°, the cable is lengthened three units. It is lengthened six units by lever 18, but it is shortened three units by lever 12, with a net change of three units. The operation is efficient because there is no excess travel of the cable to home position or other intermediate position. Meanwhile, during the movement of the lower ends of the levers toward the left, the pin 39 of lever 18 is free to retract as its spring moves from flexed to normal position.

Because the levers 12 and 18 are oppositely effective, it may be said that the motor means oscillates them in phase opposition, even though they move in the same direction. Their motion is in phase opposition in respect to the lengthening or shortening effect on the cable 16, which is the important thing to consider.

Figure 1:
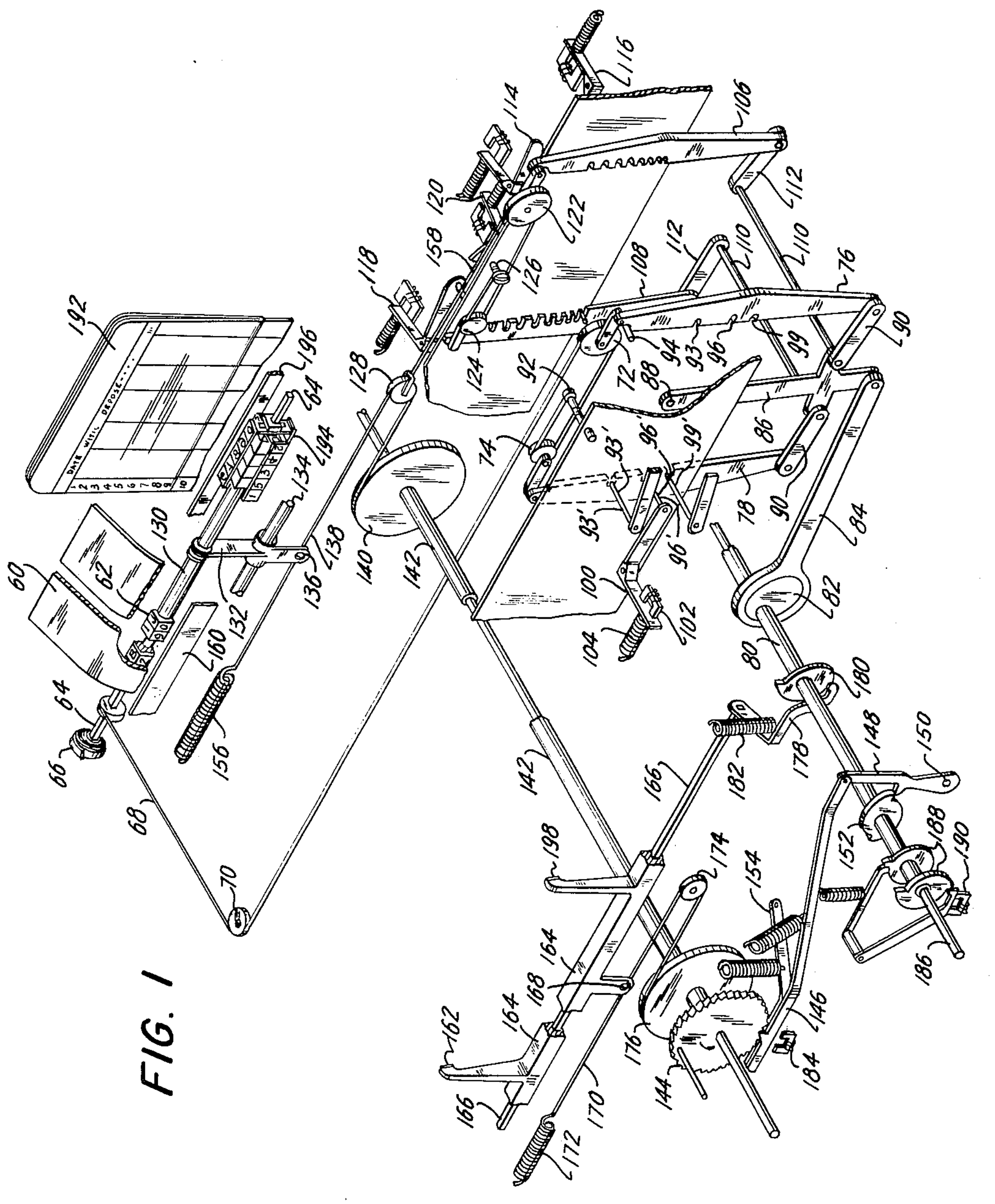
FIG. 1 is a perspective view schematically illustrating a printer embodying features of the invention.

Attention is next directed to FIG. 1 of the drawing, this being a perspective and somewhat exploded schematic view of a printer used to print a flexible sheet 60 which is being fed upward in front of a type cylinder 62. The sheet is broken away to show the type cylinder, and both the sheet and cylinder are broken away from left to right because they are wider than here shown. The illustrated type cylinder has four sides, and is axially slidable on a splined or square shaft 64. This is spring loaded clockwise by a return spring 66, and may be turned counter-clockwise by a cable 68. The cable passes around a pulley 70 and runs to differential pulleys 72 and 74 at the upper ends of notched selector levers 76 and 78. These are driven by a motor (not shown) connected to a shaft 80 driving an eccentric 82 connected by a link 84 to an intermediate lever 86 pivoted on a stationary pivot at 88. Selector levers 76 and 78 are connected to arm 86 by links 90. The cable is anchored on a fixed post 92.

The top pin 94 is stationary and corresponds to the home position of selector lever 76. This has three notches 93, 96 and 99, which correspond to the third, sixth and ninth pins (that is to pins 33, 36 and 39 in FIG. 2) thus providing four equally spaced positions, instead of ten. These correspond to the four sides of the type cylinder 62. The movable fulcrum pins for lever 76 are not shown in FIG. 1, but the corresponding three pins for selector lever 78 are shown at 93′, 96′ and 99′. Pin 96′ is moved by angle lever 100 under the influence of electromagnet 102 and a return pull spring 104. The magnets for pins 93′ and 99′ are not shown, but may be of similar construction, though oppositely positioned.

Type cylinder 62 is ten characters long, and therefore is moved through ten positions in axial direction. The notched selector levers for this purpose are shown at 106 and 108. Their lower ends are driven by the same shaft 80, and as here illustrated, the same eccentric 82, link 84 and intermediate arm 86, the additional connection being by means of rods 110 and links 112, it being understood that rods 110 have been greatly lengthened in order to separate the axial selector levers from the rotary selector levers for illustration.

The selector levers 106 and 108 each have nine notches cooperating with nine fulcrum pins, in adidtion to a fixed pin at the upper end. The fulcrum pins are moved by angle levers with return springs and magnets, and to provide room for the magnets the alternate angle levers extend in one direction, and the intermediate angle levers extend in opposite direction, as indicated by angle levers 114 and 116 for selector lever 106, and angle levers 118 and 120 for selector lever 108.

Selector lever 106 carries a differential pulley 122 at its upper end, and selector lever 108 carries a differential pulley 124 at its upper end. A selector cable starts at a fixed post 126 and passes around pulley 124 and thence around pulley 122 and thence to the type cylinder 62. However, for a reason next explained, the connection is indirect, and takes place through a coupling pulley 128.

Inasmuch as the printer is a page printer it requires a step by step or character advance of the type cylinder across the page. The type cylinder is connected by a sleeve 130 to a yoke 132, slidable on a stationary guide rod 134, and connected at 136 to a cable 138. This cable passes around coupling pulley 128, and is secured to a step by step feed drum 140. The latter is connected by a shaft 142 to a ratchet wheel 144, operated by a feed pawl 146, connected to a cam follower arm 148 pivoted at 150 and cooperating with a cam 152 on shaft 80. Ratchet wheel 144 is also acted on by a holding pawl 154.

The other end of cable 138 is connected to a takeup spring 156. It will be evident that because of the coupling 128 between the feed cable 138 and the selector cable 158, the cable 138 experiences a character selection movement in addition to the step by step feed movement across the page being printed.

An ink ribbon 160 is disposed in front of the sheet 60 at the type cylinder. It is in the path of an oscillatable print hammer 162, which is here shown far to the left to separate the mechanisms. The hammer moves with the type cylinder across the page, and for this purpose the hub portion 164 of the hammer is slidable on a suitable splined or square shaft 166. It is connected at 168 to a cable 170, one end of which is connected to a takeup spring 172, and the other end of which passes about a guide pulley 174 and is secured to a step by step feed drum 176 on the shaft 142 previously referred to. Thus, the drum 176 has the same motion as the drum 140 and moves the hammer along with the average or print position of the type cylinder 62. The character selection portion of the total movement of the type cylinder takes place relative to the hammer 162.

The forward or striking movement of the hammer is obtained by means of a cam follower arm 178 actuated by a cam 180 and a pull spring 182. When shaft 80 has turned a half revolution, during which the type cylinder has been moved to a selected character, the drop of cam 180 is reached, and the hammer moves abruptly forward to strike the ribbon and paper against the type cylinder, and so prints the selected character. During the next half revolution the hammer is moved back, and during its return movement the drop of cam 152 is reached, which causes a step in the travel of the type cylinder and the hammer across the page.

For purpose of the present disclosure, it is assumed that there is a fifteen wire input to the printer. There are three wires for the three pairs of rotary selection magnets. There are nine wires for the nine pairs of axial selection magnets. An adidtional wire may be provided for magnet 184 which retracts the pawls 146 and 154 of ratchet wheel 144 for carriage return, and for line feed, that is, upward movement of the paper 60 to begin the printing of a new line. The mechanism for this line feed is not shown, but may be conventional. Often it is associated with and takes place as a part of carriage return. If separately controlled, an adidtional input wire would be provided.

The shaft 80 may be turned in half revolutions on a stop-start basis, and in such case may be intermittently driven from a continuously driven shaft 186, through a suitable half revolution clutch mechanism symbolized at 188, under the control of a magnet 190. This magnet may be energized through another wire, and there also is needed a ground or common return making fifteen wires, or sixteen with a separate line feed control. Other wires could be added for other special functions.

The particular printer here shown is intended for use in savings banks, and is intended to simultaneously print a wide tape or sheet 60 for the bank record, and a passbook 192 for the depositor. Because the latter is stiff it is not feasible to print through the passbook with a type cylinder behind the book. Instead a special kind of type cylinder 194 is disposed in front of the book, with an ink ribbon 196 disposed between the type cylinder and the book. The type cylinder 194 is made up of sections or elements which are independently movable transversely of the remainder of the type cylinder. The type cylinder is connected to the tubular hub portion 130 which receives the forked upper end of the yoke 132 previously referred to. The type cylinder 194 experiences the same rotary and axial selection as the type cylinder 62.

There is a second printing hammer 198 mounted on the hub portion 164 previously referred to, so that both hammers move across the page and both print simultaneously when the square shaft 166 is oscillated. Hammer 198 strikes one of the sections or elements of the type cylinder 194 and moves it forward against the ink ribbon and passbook. A preferred form of type cylinder for this purpose is described in my co-pending application, Serial No. 285,441, filed June 4, 1963, now U.S. Patent No. 3,169,474, and entitled Type Cylinder.

The parts 188, 190 in FIG. 1 schematically represent a clutch release and stop cam. These are employed when operating on a stop-start basis, with the stopping and starting of the cam shaft to be synchronized with received signals. Instead, the cam shaft may run free, but be slaved to the signal generating source.

A preferred form of printer may be described in detail with reference to FIGS. 6 through 12 of the drawing. Referring first to FIGS. 6 and 8, the selector mechanism comprises selector levers 200 and 202 which are disposed side by side. A motor 203 drives a cam shaft 204 by means of a timing belt 205 running on a toothed pulley 456. The shaft carries a pair of cams 206 and 208 oriented 180° apart. The cam 206 oscillates lever 200 and is shown in FIG. 6 in high position, while the cam 208 oscillates lever 202 and is shown in low position. The drawing assumes that the fulcrum pins 253, 256 and 259 are retracted, so that both levers are in home position. With pin 259 inserted, the lever 200 would assume the position indicated in broken lines at 200′. In this case the pairs of pins are aligned, whereas in FIG. 2 they form a "mirror image," but in both cases the location of the pins corresponds to the retracted position of the levers.

At their outer ends the notched levers are connected differentially. Referring to FIG. 8 there is a cable 210 which passes around a vertically movable coupling pulley 212, one end of the cable being connected through an upright link 214 to the notched lever 200, and the other end of the cable being connected through an upright link 216 to the other notched lever 202. The term "cable" is here used generically, as applied to a flexible strand which may be a cord, chain, or tape. The present cable 210 is a flat tape or belt, which has advantages when as here no twist is required.

Reverting to FIG. 6, in the present arrangement the levers are side by side and face in the same direction, but they are oppositely effective because they are moved by two cams which are 180° apart, whereas in FIGS. 1 and 2 a single eccentric was used but the levers were oppositely faced. In FIG. 6 cams are employed rather than a crank or an eccentric, in order to provide a dwell period for the printing action. The particular drive used in FIG. 6 is continuous rather than stop-start. The cam shape is so designed that the motion of the levers is a harmonic motion, much the same as when using a crank or an eccentric, but there is a dwell period between the upward swing and the downward swing of the notched lever.

The type cylinder shaft is shown at 220, and at one end it carries a drum 222 receiving one end of a rotary selection cable 224, the said cable being secured to the drum at 226 (FIG. 8). Cable 224 passes around a movable pulley 228, and then upward to a fixed post on which it is secured at 230. The movable pulley 228 is linked to the coupling pulley 212 by a pair of spaced upright links 232. These linked pulleys are also shown in FIG. 6, the coupling pulley 212 being bound to the movable pulley 228 by links 232, and the rotary selection cable 224 extending up to drum 222.

The rotary selection cable 224 works in opposition to a return spring, and in the present case a drum 236 (FIG. 6) immediately adjacent drum 222 carries a return cable 234 (FIG. 8) which is guided around a pulley 236 and then downward. Referring now to FIG. 6, the cable 234 then passes around a pulley 238 and thence upward to a stationary post 240. Pulley 238 is carried on the arm 240′ of an angle lever which is pivoted at 242, and the other arm of which is shown at 244. The angle lever is acted on by a spring 246 which is fixed on the machine frame at 248, and is connected to the end of arm 244. The spring tends to straighten, and so urges pulley 238 downward, and thus provides the desired return spring action. The particular bent spring arrangement shown has the advantage of providing constant tension.

As in FIG. 1, the rotary selection here requires only four positions, and therefore needs only three fulcrum pins, which are indicated at 253, 256 and 259. The notched levers are shown with nine instead of three notches, but this is done merely to standardize the selector levers, so that the same levers may be used for the axial selection described later. It also affords flexibility in design, in that a type cylinder having more than four faces could be employed, say five or ten faces, which would provide 50 or 100 characters if needed. The magnets for operating the three pins are shown at 263, 266 and 269. The magnet arrangement could include yieldable springs, as was shown in FIGS. 3, 4 and 5, but these are not essential, and in FIG. 6 the fulcrum pin linkage is direct and positive.

The magnet and fulcrum pin construction is shown in greater detail in FIG. 9*a* in which magnet 263 attracts an armature 264 pivoted at 265 and urged outward by a return spring 267. The armature carries an adjusting screw 268 which bears against the fulcrum pin 253. The latter has its own return spring, this being a light compression spring 254. The selector lever is shown in cross section at 200, adjacent a fixed guide plate 255 for the line of fulcrum pins. The guide plate is mounted on a main frame plate 600. The three magnets are mounted on a plate 262, which is itself mounted on the frame plate 600.

The cam follower linkage is somewhat indirect, in order to provide some improvements next described. Cam 206 (FIG. 6) is engaged by a cam roller 270 carried at the end of a cam roller arm 272 pivoted on a fixed pivot 274. Arm 270 has a pin 276 directly above the cam roller, and this bears on an intermediate lever 278 which is pivoted at 280. It is urged downward by a pull spring 282, and its movable end is pivoted at 284 to an upright link 286, the lower end of which is connected at 288 to lever 200.

The fixed pivot point 280 is adjustable to vary the position and stroke of the selector lever. It is adjustable vertically by being secured to a plate 290 which is pivoted on a fixed pivot 292. The plate has a slot 294 and a lock screw 296, and by slightly raising or lowering the plate 290 about pivot 292, the position of pivot 280 may be adjusted vertically. This in turn adjusts the relation of the notched selector arm relative to the fulcrum pins. The motion is limited by a lug 291 received in a slot 293.

The position of pivot 280 is also adjustable longitudinally of the intermediate lever 278, that is, left or right as shown in FIG. 6. For this purpose the pivot is mounted on a generally upright arm 298 pivoted on plate 290 at 300. The upper end of arm 298 is slotted at 302. It is pulled to the right by a spring 304, and may be adjusted to the left by a screw 306 for very fine adjustment of the stroke or travel of the selector lever. The adjustment may be locked by means of a lock screw 308 passing through slot 302.

It will be understood that the described linkage for the selector lever 200 is duplicated for the selector lever 202, the latter having an upright link 418 connected to a generally horizontal intermediate lever 416 like the lever 278, and this in turn being mounted for vertical and horizontal adjustment. Actually it is lever 416 that is pivoted on adjustable part 290. Lever 278 is pivoted on another part like part 290, but located in front of part 290. Referring to FIG. 8, the selector levers 200 and 202 are located between large upright frame plates 600 and 602, and one adjusting part like the part 290 shown in FIG. 6 is mounted on the inside of the front frame plate 600, while the other adjusting part 290 is mounted on the inside of the back frame plate 602. In FIG. 6 the rear adjusting part is shown, as though the front one has been removed, but most of the front lever 278 has been retained. The right end only of lever 416 is shown on part 290.

The front frame plate has been removed to expose much of the mechanism between the frame plates, but the magnet assembly shown mounted on a small rectangular plate 262 is really mounted on the front face of the omitted front frame plate 600.

There are two assemblies of magnets and fulcrum pins, one on the outside of each of the main upright frame plates 600 and 602, and each magnet assembly cooperating with its adjacent slector lever. However, the corresponding magnets in front and back are energized in unison, the magnets being electrically conected together. In an operative sense they are a single means.

The axial selection may be described with reference to FIGS. 7 and 9 of the drawing. Referring to FIG. 7 the selector levers are shown at 310 and 312, the lever 310 being operated by cam 206, and the lever 312 by cam 208. The fulcrum pins are assumed to be retracted, with levers 310 and 312 in home position. However, on insertion of the fulcrum pin of magnet 329, the lever 310 would be moved down to the broken line position indicated at 310'.

In this case there are nine fulcrum pins for each lever, operated by magnets as before, and to provide room for the magnets they are alternated, the magnets 321, 323, 325, 327 and 329 being shown above the line of fulcrum pins, and the magnets, 322, 324, 326 and 328 being shown below the line of fulcrum pins. The magnets are mounted outside a separate plate 314, and it will be understood that there are two such plates of magnets, outside the upright frame plates, with the selector levers therebetween, and with the magnets mounted on the outsides of the plates. The fulcrum pins pass through the plates to engage the nearer notched lever.

For the sake of accurate adjustment of the position and stroke of the notched levers, they are driven indirectly as previously described. Cam 206 is engaged by cam roller 270 carried on arm 272 pivoted at 274, and carrying a pin 276. These are the same parts which were previously described. The pin 276 bears on an intermediate lever 330 connected to notched lever 310 by a transverse or upright link 332. Intermediate lever 330 is pivoted at 334 on an upright arm 336 pivoted at 338. The position of arm 336 is accurately adjustable by means of an adjusting screw 338 opposing a spring 340, and the adjustment may be locked by a lock screw 342. Arm 336 is itself carried by a plate 344 pivoted at 346 and vertically adjustable by means of a lock screw 348 passing through a slot 350. The maximum travel of plate 344 is limited by an ear 352 movable in a slot 354. This adjustment means is duplicated for the other intermediate lever 356.

As in FIG. 6, the plate 344 is really for the rear lever 356, the front plate being removed for clarity and yet most of the front lever 330 is retained. The front frame plate is removed, except that the front magnet assembly 314 is retained.

It will be understood that the cam roller and its arm are duplicated for cam 208, in order to drive the other intermediate lever 356 which is connected by an upright link 358 to the other notched lever 312, the notched levers being driven in phase opposition and being oppositely effective, all as previously described.

Referring now to FIG. 9, the differential connection between the notched levers is like that previously described in FIG. 8, there being a coupling pulley 360 around which a cable in tape form is passed. The cable end 362 is connected to a link 364 which is connected to notched lever 312, and the cable end 366 is connected to a link 368 leading to the notched lever 310.

It will be understood that the differential connection shown in FIGS. 8 and 9 between the selector levers need not necessarily use a cable and pulley. For example, by widely spacing the levers, they could be connected by a cross bar or link, and the upward connection therefrom could be made to the middle of the cross link. The cable and coupling pulley shown in FIGS. 8 and 9 is precisely such a lever, but in a continuously renewable form, so that it may be very short in length, the said short length being the pulley diameter.

Reverting now to FIG. 7, the type cylinder 370 moves axially in front of a paper 372, it being axially slidable on a square shaft 220. The type cylinder includes a hub portion 374 having an annular groove receiving a yoke 376 carried by a sleeve 378 which is slidable on a guide rod 380. The yoke is moved by a flat cable or tape 382 to which it is connected at 384. Its left end passes around a guide pulley 386 and another guide pulley behind pulley 388, and is secured at 390 to a spring operated hollow takeup drum behind drum 392. The spring is a spiral ribbon spring housed within the drum.

The other end of cable 382 passes around a pulley 394 and is then formed into a U-shaped loop around a movable pulley 396, which is connected by a link 398 to the coupling pulley 360 previously mentioned. The link connects the pulleys in a 90° relation, as shown. The cable 82 then continues upward to and is secured to a step-by-step character advance drum behind drum 400. The drums are turned by a ratchet wheel 402 operated by a feed pawl 404 as described later. FIG. 9 also shows the link 398 between the coupling pulley 360 and the movable pulley 396 for the tape cable 382. FIG. 8 shows the guide pulleys 386 and 388 for tape cable 382 at the other end of the machine just inside the takeup drum.

There are four notched levers and four intermediate levers to operate the same, but there are only two cams and two cam rollers. The pairs of notched levers have been separated in FIGS. 6 and 7 for clarity, but it will be understood that in the machine they are disposed substantially end to end, with the cam shat 204 therebetween, so that cam 206 shown in high position serves to raise the notched levers 200 (FIG. 6) and 310 (FIG. 7) which are in raised position, while the cam 208 which is in low position serves for the notched levers 202 (FIG. 6) and 312 (FIG. 7) which are in down position.

This arrangement may be explained in greater detail with reference to FIGS. 10 and 11. Cam roller 270 is carried between spaced arms 272 which are welded to a hub 273 pivoted at 274. Intermediate lever 330 is pivoted at its left end 334, and its movable end carries the upright link 332 (actually a double link) which extends down to one of the notched levers (shown at 310 in FIG. 7). The intermediate lever is urged downward by a generally upright pull spring 331, anchored at its lower end on a cross rod 359. The intermediate lever 278 is also acted on by the same cam roller. Its pivoted end is not shown at the right, it being off the paper. The lever is pulled down by pull spring 282 anchored at its lower end on a cross rod 422. Its movable end is connected by upright links 286 to a notched lever (shown at 200 in FIG. 6).

The other cam, which is on the same cam shaft 204 but in opposite phase, acts on a cam roller 406 (FIG. 10) carried between arms 408 which are welded to a hub 410 which is pivoted at 274. It acts on an intermediate lever 356 which is pivoted at 414 on its own adjustable plate as previously described, and the free end of which is connected by upright links 358 to a notched lever (312 in FIG. 7). The intermediate lever is urged down by an upright pull spring 357, the lower end of which is connected to cross rod 359. The same cam roller 406 serves another intermediate lever 416, pivoted at its right end on a pivot which is not shown because it is off the paper. The pivot is on an adjustable plate as previously described. The movable end of intermediate lever 416 is connected by upright links 418 to a notched lever (202 in FIG. 6). The intermediate lever 416 is urged down by a pull spring 420 connected to cross rod 422. The intermediate levers 356 and 416 are held against sideward movement by upright guides 424.

Referring to FIG. 11 the guides 424 hold the intermediate levers 416 and 356 against sideward movement. This view also shows how cam roller 406 rests on cam 208, while the intermediate levers rest on a hardened pin 426 located outside or directly above the roller 406. The same construction is used for the other cam roller and its intermediate levers.

Reverting to FIG. 7 the print hammer 430 is carried on a hub 432 which is slidable on a non-circular shaft 434. The hammer is moved step by step along with the type cylinder, but without the additional movement for character selection which is experienced by the type cylinder. For this purpose the sleeve portion 432 of the hammer is secured at 434 to a cable 436 which may be in tape or belt form. At its left end the cable 436 passes beneath a guide pulley 388 and is then secured around a takeup drum 392 in front of and secured to or integral with the drum for the type cylinder.

At its other end the hammer cable passes around a guide pulley 438 and then is secured to a feed drum 400 in front of and secured to or integral with the drum for the type cylinder. Both are operated together, step-by-step, by the ratchet wheel 402 and its feed pawl 404.

Referring now to FIG. 12, feed pawl 404 is formed at the right end of a long strip 440 connected at 442 to the upright arm 444 of an angle lever pivoted at 446. The other arm 448 carries a cam roller 450 operated on by a cam 452. It is a double cam and causes character advance after each selection and hammer operation, there being two operations for each revolution of the cam shaft. A magnetically operated lock 453 may be used to prevent character advance when the machine is idling.

This cam is one of a series of cams on the main cam shaft, and referring now to FIG. 8 the cam shaft 204 carries the main oppositely phased cams 206 and 208 for oscillating the notched levers. These are located between upright frame plates 600 and 602. The cam shaft carries and is driven by a toothed pulley 456 of a timing belt 205 which leads to the driving motor 203. The cam shaft additionally carries the cam 452 last referred to which provides character advance. It also carries a cam 458 for operating the hammer, and a cam 480 for carriage return.

Referring to FIG. 8*a* the cam 458 has an abrupt drop. This is followed by an arm 460 privoted at 462. At its other end 464 it is arranged to rock the hammer shaft. The mechanism for this is shown in FIG. 9, in which hammer shaft 434 carrying hammer 430 is rocked by an arm 466 which is pulled down by a hook 468 connected at its lower end 470 by means of a link 472 to lever 464. It is desired that the hammer be free for inertia travel at the end of its stroke, and for that purpose the hook 468 has a camming projection 474 which rides against a fixed camming surface 476 as the hook descends. This disengages the took from arm 466. On the upward return stroke of the hook, it reengages the arm 466. This happens once for each character or half revolution of the main cam shaft, the cam 458 (FIG. 8*a*) being a double cam like the others. The hammer action may be idled by a magnetic lock 461 when the machine is idling.

Reverting to FIG. 12 the cam marked 480 causes carriage return when its cam follower is released by a magnetically operated lock 481. To cause carriage return, an arm 482 moves upward, this arm being pivoted at 484. Its continuation 486 has a pin 488 which overlies the feed pawl, and also a check pawl which is alongside and largely concealed by the feed pawl, the check pawl being pivoted at 490 and urged into engagement by a pull spring 492. For carriage return the pin 488 moves down and thus moves both the feed and the check pawls downward. This happens only when magnetic lock 481 is released by an appropriate signal.

The operation of lever 482, 486 and pin 488 may be momentary, because the pawls when moved down are caught by a detent hook 494 which holds them down. The pawls have pins 495 which engage and are held by the hook 494 during carriage return. The detent hook 494 is pivoted at its lower end, and its upper end is urged toward the right by a pull spring 496 on the right end of cross arm 498. The detent hook is disengaged at the beginning of the typing of the next line because the hammer action moves a pin 497 down, which moves the left end of arm 498 downward, thereby turning the detent hook 494 to the left, and so disengaging the feed and holding pawls, so that the normal step by step character advance may proceed. The cross arm 498 is also shown in FIG. 8*a*, where it is acted on by the hammer linkage.

The mechanism for line feed, that is, an upward feed of the sheet of paper for printing of the next line, may be conventional and is not shown.

Reverting to FIG. 8 the cam shaft may additionally carry a cam 500 for ribbon feed, and a cam 502 for so vibrating or "dancing" the ribbon as to normally uncover the characters previously printed. The ribbon feed and vibrating mechanisms may be conventional, and are therefore not described in detail, but part of the mechanism is shown in FIG. 9, at 520 and 522. In FIG. 8 no attempt has been made to show cam shape or position.

The cam shaft 204 (FIG. 8) also carries a series of switch operating cams which are employed for certain refinements unnecessary here to describe in detail. Briefly the switch cam 504 is employed to show completion of the print cycle; cam 506 provides resumption of print control; cam 508 is for an echo check switch; and cams 510 and 512 are for "junk" inhibiting switches. In the particular case here shown the printer is fed by a computer, and during the computer recycling period the junk inhibiting switches prohibit false information originating in the computer from setting up a functional response in the printer.

In the particular printer here shown there are nineteen wires leading to the printer. There are three wires and their common return for rotary selection, the magnets being in pairs so that the six magnets (three in front, three in back) require only three leads and a common return. A pair of magnets together may be considered to be a means to move a pair of pins for the pair of levers.

There are nine wires and their common return for axial selection. Here again, the front and back magnets are paired, and require only one input wire for each pair, the pair acting as a means to move a pair of pins.

There are four adidtional wires with their own common return, these wires being for control of the magnetic locks previously mentioned for carriage return; character advance release; hammer release; and ribbon feed release. It may be explained that in the present machine the cam shaft runs continuously, but during periods when the printer is not in use the mechanisms for character advance, hammer action, and ribbon feed are disabled to eliminate unnecessary wear and noise.

Using three separate common returns as described above, the printer is connected to nineteen wires in all.

It is believed that the construction and operation of my improved printer selector mechanism, as well as the advantages thereof, will be apparent from the foregoing detailed description. No clutches are required, thereby avoiding difficulty with clutch wear. The entire travel is obptained directly from a single selector lever. By use of a double lever instead of a single lever a character is printed for each swing, and the travel of the type body is minimized because it moves differentially from its last position to its next position without having to go back to a home position therebetween. This also reduces the time needed for selection, and thereby speeds the operation of the machine.

One advantage of the selector lever system is that it permits movement of the type head at high speed without "bounce," because the motion may be and is designed to be a harmonic motion. An eccentric as in FIG. 1, or a crank as in FIG. 2, inherently produce a harmonic motion, and in FIGS. 6 and 7, where cams are employed, the cams are designed to produce a harmonic motion in addition to a dwell.

The system shown is used for only 40 characters, but is usable with very little change up to as many as 100 characters. For this it would be necessary merely to provide a type cylinder with 10 instead of 4 faces, the rotary selection levers then having nine instead of three fulcrum pins.

As here shown, a parallel electrical input on multiple wires, one wire for each pair of magnets, is assumed, but it will be understood that pulses or bits received serially over a single line may be employed after conversion in conventional conversion apparatus. The motions are obtained under power drive, but are controlled by a very low signal power which needs only to slightly move a fulcrum pin axially at a time when there is no frictional load on the fulcrum pin. The signal need not be maintained, because the fulcrum pin is held frictionally by the load of the selector lever once it engages the pin.

It will be apparent that while I have shown and described the invention in several forms, changes may be made without departing from the scope of the invention as sought to be defined in the following claims.

I claim:

1. Selector mechanism for moving a body to select a desired position, said mechanism comprising a selector lever connected at one end to the body and at the other end to motor means for oscillating said latter end, a fulcrum pin at an intermediate point along the lever and movable transversely of the plane of movement of the lever into or out of the path of movement of the lever to make the pin effective or ineffective, means to fixedly support the fulcrum pin against movement in the plane of movement of the lever for its normal action as a fixed fulcrum for the lever, and a means to move said pin into the path of the lever to make said pin effective, whereby operation of said fulcrum pin moving means produces a corresponding position of the body.

2. Selector mechanism for moving a body to select a desired position, said mechanism comprising a selector lever connected at one end to the body and at the other end to motor means for oscillating said latter end, a plurality of fulcrum pins along the lever and movable transversely of the plane of movement of the lever into or out of the path of movement of the lever, means to fixedly support the fulcrum pins against movement in the plane of movement of the lever for their normal action as a fixed fulcrum for the lever, and a plurality of means to move one or another of said pins into the path of the lever to make said pin effective, whereby operation of one of said fulcrum pin moving means produces a corresponding position of the body.

3. Selector mechanism for moving a body to select a desired position, said mechanism comprising a notched selector lever connected at one end to the body and at the other end to motor means for oscillating said latter end, a plurality of fulcrum pins along the lever and movable transversely of the plane of movement of the lever into or out of the path of movement of the lever at one notch or another, a fixed pin at the first end of the lever corresponding to home position, means to support the fulcrum pins for their normal fulcrum action on the lever, and a plurality of means to move said fulcrum pins, whereby operation of one of said fulcrum pin moving means produces a corresponding position of the body, the fulcrum pins being so non-uniformly spaced along the lever that the increments of motion of the body are uniform.

4. In a printer, selector mechanism for moving a type body to select a desired character under electrical control, said mechanism comprising a movable type body, a selector lever connected at one end to the type body and at the other end to motor means for oscillating said latter end, a plurality of fulcrum pins along the lever and movable transversely of the plane of movement of the lever into or out of the path of movement of the lever, means to support the fulcrum pins for their normal fulcrum action on the lever, and a plurality of magnets to move said pins, whereby energization of a magnet produces a corresponding selection of a character.

5. In a printer, selector mechanism for moving a type body to select a desired character under electrical control, said mechanism comprising a movable type body, a notched selector lever connected at one end to the type body and at the other end to motor means for oscillating said latter end, a plurality of fulcrum pins along the lever and movable transversely of the plane of movement of the lever into or out of the path of movement of the lever at one notch or another, means to support the fulcrum pins for their normal fulcrum action on the lever, a fixed pin at the first end of the lever corresponding to home position, and a plurality of magnets to move said fulcrum pins, whereby energization of a magnet produces a corresponding selection of a character.

6. In a printer, selector mechanism for moving a type body to select a desired character under electrical control, said mechanism comprising a movable type body, a notched selector lever connected at one end to the type body and at the other end to motor means for oscillating said latter end, a plurality of fulcrum pins along the lever and movable transversely of the plane of movement of the lever into or out of the path of movement of the lever at one notch or another, means to support the fulcrum pins for their normal fulcrum action on the lever, a fixed pin at the first end of the lever corresponding to home position, and a plurality of magnets to move said fulcrum pins, whereby energization of a magnet produces a corresponding selection of a character, the fulcrum pins and notches being so non-uniformly spaced along the lever that the increments of motion of the type body are uniform.

7. Selector mechanism for moving a body to select a desired position, said mechanism comprising a pair of oppositely effective selector levers differentially connected at one end to the body and connected at their other ends to motor means for oscillating the latter ends effectively in phase opposition, a plurality of fulcrum pins along each lever and movable transversely of the plane of movement of the lever into or out of the path of movement of the lever, means to support the fulcrum pins for their normal fulcrum action on the lever, and a plurality of means to move said pins, whereby operation of selected ones of said fulcrum pin moving means produces a corresponding position of the body for each swing of the levers.

8. Selector mechanism for moving a body to select a desired position, said mechanism comprising a pair of oppositely effective selector levers differentially connected at one end through a cable and pulley system to the body and connected at their other ends to motor means for oscillating the latter ends effectively in phase opposition, a like plurality of fulcrum pins along each lever movable into or out of the path of movement of the lever, a plurality of means to move pairs of corresponding pins of the two levers, whereby operation of one of said fulcrum pin moving means produces a corresponding position of the body for each swing of the levers.

9. Selector mechanism for moving a body to select a desired position, said mechanism comprising a pair of oppositely effective notched selector levers differentially connected at one end to the body and connected at their other ends to motor means for oscillating the latter ends effectively in phase opposition, a like plurality of fulcrum pins along each lever movable into or out of the path of movement of the lever at one notch or another, a fixed pin at the first end of each lever corresponding to home position, a plurality of means to move pairs of corresponding fulcrum pins of the two levers, whereby operation of one of said fulcrum pin moving means produces a corresponding position of the body for each swing of the levers, the fulcrum pins being so non-uniformly spaced along the levers that the increments of motion of the body are uniform.

10. In a printer, selector mechanism for moving a type body to select a desired character under electrical control, said mechanism comprising a movable type body, a pair of oppositely effective selector levers differentially connected at one end to the type body and connected at their other ends to motor means for oscillating the latter ends effectively in phase opposition, a like plurality of fulcrum pins along each lever movable into or out of the path of movement of the lever, a plurality of magnetic means to move pairs of corresponding pins of the two levers, whereby energization of a magnetic means produces a corresponding selection of a character for each swing of the levers.

11. In a printer, selector mechanism for moving a type body to select a desired character under electrical control, said mechanism comprising a movable type body, a pair of oppositely effective notched selector levers differentially connected at one end through a cable and pulley system to the type body, and connected at their other ends to motor means for oscillating the latter ends effectively in phase opposition, a like plurality of fulcrum pins along each lever movable into or out of the path of movement of the lever at one notch or another, a fixed pin at the first end of each lever corresponding to home position, a plurality of magnetic means to move pairs of corresponding pins of the two levers, whereby energization of a magnetic means produces a corresponding selection of a character for each swing of the levers.

12. In a printer, selector mechanism for moving a type body to select a desired character under electrical control, said mechanism comprising a movable type body, a pair of oppositely effective notched selector levers differentially connected at one end through a cable and pulley system to the type body, and connected at their other ends to motor means for oscillating the latter ends effectively in phase opposition, a like plurality of fulcrum pins along each lever movable into or out of the path of movement of the lever at one notch or another, a fixed pin at the first end of each lever corresponding to home position, and a plurality of magnetic means to move pairs of corresponding fulcrum pins of the two levers, whereby energization of a magnetic means produces a corresponding selection of a character for each swing of the levers, the fulcrum pins and notches being so non-uniformly spaced along the levers that the increments of motion of the type body are uniform.

13. Selector mechanism as defined in claim 7 in which the selector levers are disposed side by side, and in which the motor means includes a shaft carrying a pair of cams oriented 180° apart, with one cam oscillating one lever and the other cam oscillating the other lever.

14. Selector mechanism as defined in claim 8 in which the selector levers are disposed side by side, and in which the motor means includes a shaft carrying a pair of cams oriented 180° apart, one cam oscillating one lever and the other cam oscillating the other lever, the cable and pulley system including a cable forming a loop around a coupling pulley with one end of the cable connected to one lever and the other end connected to the other lever, said coupling pulley being effectively connected to the body to move the same.

15. A printer as defined in claim 10 in which the selector levers are disposed side by side, and in which the motor means includes a shaft carrying a pair of cams oriented 180° apart, one cam oscillating one lever and the other cam oscillating the other lever, the differential means including a cable forming a loop around a coupling pulley with one end of the cable connected to one lever and the other end connected to the other lever, said coupling pulley being effectively connected to the type body for character selection.

16. A printer as defined in claim 12 in which the selector levers are disposed side by side, and in which the motor means includes a shaft carrying a pair of cams oriented 180° apart, one cam oscillating one lever and the other cam oscillating the other lever, the cable and pulley system including a cable forming a loop around a coupling pulley with one end of the cable connected to one lever and the other end connected to the other lever, said coupling pulley being effectively connected to the type body for character selection.

17. A printer as defined in claim 10 in which the selector levers are disposed side by side, and in which the motor means includes a shaft carrying a pair of cams oriented 180° apart, one cam oscillating one lever and the other cam oscillating the other lever, the differential means including a cable forming a loop around a coupling pulley with one end of the cable connected to one lever and the other end connected to the other lever, said coupling pulley being effectively connected to the type body for character selection, intermediate levers moved by said cams, transverse links connecting the movable ends of the intermediate levers to the driven ends of the selector levers, the other ends of the intermediate levers being fixedly pivoted, and fixed adjustable means affording adjustment of the location of each fixed pivot.

18. A printer as defined in claim 12 in which the selector levers are disposed side by side, and in which the motor means includes a shaft carrying a pair of cams oriented 180° apart, one cam oscillating one lever and the other cam oscillating the other lever, the cable and pulley system including a cable forming a loop around a coupling pulley with one end of the cable connected to one lever and the other end connected to the other lever, said coupling pulley being effectively connected to the type body for character selection, intermediate levers moved by said cams, transverse links connecting the movable ends of the intermediate levers to the driven ends of the selector levers, the other ends of the intermediate levers being fixedly pivoted, and fixed adjustable means affording adjustment of the location of each fixed pivot.

19. A printer as defined in claim 10 in which the selector levers are disposed side by side, and in which the motor means includes a shaft carrying a pair of cams oriented 180° apart, one cam oscillating one lever and the other cam oscillating the other lever, the differential means including a cable forming a loop around a coupling pulley with one end of the cable connected to one lever and the other end connected to the other lever, said coupling pulley being effectively connected to the type body for character selection, a cam roller arm for each cam carrying a cam roller and a pin outside the cam roller, intermediate levers adjacent the cam roller arms and bearing on the pins, transverse links connecting the movable ends of the intermediate levers to the driven ends of the selector levers, the other ends of the intermediate levers being fixedly pivoted, and fixed adjustable means affording adjustment of the location of each fixed pivot transversely of the intermediate lever and longitudinally of the intermediate lever.

20. A printer as defined in claim 12 in which the selector levers are disposed side by side, and in which the motor means includes a shaft carrying a pair of cams oriented 180° apart, one cam oscillating one lever and the other cam oscillating the other lever, the differential means including a cable forming a loop around a coupling pulley with one end of the cable connected to one lever and the other end connected to the other lever, said coupling pulley being effectively connected to the type body for character selection, a cam roller arm for each cam carrying a cam roller and a pin outside the cam roller, intermediate levers adjacent the cam roller arms, and bearing on the pins, transverse links connecting the movable ends of the intermediate levers to the driven ends of the selector levers, the other ends of the intermediate levers being fixedly pivoted, and fixed adjustable means affording adjustment of the location of each fixed pivot transversely of the intermeditae lever and longitudinally of the intermediate lever.

21. A printer as defined in claim 10 in which the selector levers are disposed side by side, and in which the motor means includes a shaft carrying a pair of cams oriented 180° apart, one cam oscillating one lever and the other cam oscillating the other lever, the differential means including a cable forming a loop around a coupling pulley with one end of the cable connected to one lever and the other end connected to the other lever, a type body, a cable for moving the same relative to a page being printed, a step by step feed drum connected to one end of the cable, a takeup spring mechanism connected to the other end of the cable, said cable being coupled to the aforesaid coupling pulley, whereby the type body experiences a character selection movement in addition to the step by step movement across the page being printed.

22. A printer as defined in claim 12 in which the selector levers are disposed side by side, and in which the motor means includes a shaft carrying a pair of cams oriented 180° apart, one cam oscillating one lever and the other cam oscillating the other lever, the cable and pulley system including a cable forming a loop around a coupling pulley with one end of the cable connected to one lever and the other end connected to the other lever, a type body, a cable for moving the same relative to a page being printed, a step by step feed drum connected to one end of the cable, a takeup spring mechanism connected to the other end of the cable, said cable being coupled to the aforesaid coupling pulley, whereby the type body experiences a character selection movement in addition to the step by step movement across the page being printed.

23. A printer as defined in claim 10 in which the selector levers are disposed side by side, and in which the motor means includes a shaft carrying a pair of cams oriented 180° apart, one cam oscillating one lever and the other cam oscillating the other lever, the differential means including a cable forming a loop around a coupling pulley with one end of the cable connected to one lever and the other end connected to the other lever, a type body, a cable for moving the same relative to a page being printed, a step by step feed drum with pawl and ratchet mechanism connected to one end of the cable, a takeup spring mechanism connected to the other end of the cable, said cable being formed into a U-shaped loop around a movable pulley, said movable pulley being connected to the aforesaid coupling pulley for movement therewith, whereby the type body experiences a character selection movement in addition to the step by step movement acros the page being printed.

24. A printer as defined in claim 12 in which the selector levers are disposed side by side, and in which the motor means includes a shaft carrying a pair of cams oriented 180° apart, one cam oscillating one lever and the other cam oscillating the other lever, the cable and pulley system including a cable forming a loop around a coupling pulley with one end of the cable connected to one lever and the other end connected to the other lever, a type body, a cable for moving the same relative to a page being printed, a step by step feed drum with pawl and ratchet mechanism connected to one end of the cable, a takeup spring mechanism connected to the other end of the cable, said cable being formed into a U-shaped loop around a movable pulley, said movable pulley being connected to the aforesaid coupling pulley for movement therewith, whereby the type body experiences a character selection movement in addition to the step by step movement across the page being printed.

25. A printer as defined in claim 10 in which the type body is a cylinder, and in which there is a first pair of selector levers for rotary character selection and a second pair of said selector levers for axial character selection, the first pair being disposed side by side pointing in one direction and the second pair being disposed side by side and pointing in opposite direction, the motor means being a shaft disposed between the pairs of levers and carrying two cams oriented 180° apart, one cam being connected to drive one lever of each pair and the other cam being connected to drive the other lever of each pair.

26. A printer as defined in claim 10 in which the type body is a cylinder, and in which there is a first pair of selector levers for rotary character selection and a second pair of said selector levers for axial character selection, the first pair being disposed side by side pointing in one direction and the second pair being disposed side by side and pointing in opposite direction, the motor means being a shaft disposed between the pairs of levers and carrying two cams oriented 180° apart, one cam being connected to drive one lever of each pair and the other cam being connected to drive the other lever of each pair, the differential means for each pair including a U-shaped loop of cable around a coupling pulley with one end connected to one lever and the other end connected to the other lever of each pair of levers, the coupling pulley of one pair being connected to rotate a splined shaft on which the type body is axially slidable, the coupling pulley of the other pair being connected to move the type body axially.

27. A printer as defined in claim 12 in which the type body is a cylinder, and in which there is a first pair of selector levers for rotary character selection and a second pair of said selector levers for axial character selection, the first pair being disposed side by side pointing in one direction and the second pair being disposed side by side and pointing in opposite direction, the motor means being a shaft disposed between the pairs of levers and carrying two cams oriented 180° apart, one cam being connected to drive one lever of each pair and the other cam being connected to drive the other lever of each pair, the cable and pulley system for each pair including a U-shaped loop of cable around a coupling pulley with one end connected to one lever and the other end connected to the other lever of each pair of levers, the coupling pulley of one pair being connected to rotate a splined shaft on which the type body is axially sildable, the coupling pulley of the other pair being connected to move the type body axially.

28. A printer as defined in claim 10 in which the type body is a cylinder, and in which there is a first pair of selector levers for rotary character selection and a second pair of said selector levers for axial character selection, the first pair being disposed side by side and the other pair being disposed side by side, the motor means being a shaft carrying cams oriented 180° apart, the differential means for each pair including a U-shaped loop of cable around a coupling pulley with one end connected to one lever and the other end connected to the other lever of each pair of levers, the coupling pulley of one pair being connected to rotate a splined shaft on which the type body is axially slidable, the type body being moved axially by a cable connected at one end to a step by step feed drum and connected at its other end to a takeup spring, said cable being formed into a U-shaped loop around a movable pulley, and said movable pulley being connected to said coupling pulley for movement thereby.

29. A printer as defined in claim 12 in which the type body is a cylinder, and in which there is a first pair of selector levers for rotary character selection and a second pair of said selector levers for axial character selection, the first pair being disposed side by side and the other pair being disposed side by side, the motor means being a shaft carrying cams oriented 180° apart, the cable and pulley system for each pair including a U-shaped loop of cable around a coupling pulley with one end connected to one lever and the other end connected to the other lever of each pair of levers, the coupling pulley of one pair being connected to rotate a splined shaft on which the type body is axially slidable, the type body being moved axially by a cable connected at one end to a step by step feed drum and connected at its other end to a takeup spring, said cable being formed into a U-shaped loop around a movable pulley, and said movable pulley being connected to said coupling pulley for movement thereby.

30. A printer as defined in claim 10 in which the type body is a cylinder, and in which there is a first pair of selector levers for rotary character selection and a second pair of said selector levers for axial character selection, the first pair being disposed side by side pointing in one direction, and the second pair being disposed side by side and pointing in opposite direction, the motor means being a shaft disposed between the pairs of levers and carrying two cams oriented 180° apart, one cam being connected to drive one lever of each pair and the other cam being connected to drive the other lever of each pair, the differential means for each pair including a U-shaped loop of cable around a coupling pulley with one end connected to one lever and the other end connected to the other lever of each pair of levers, the coupling pulley of one pair being connected to rotate a splined shaft on which the type body is axially slidable, the type body being moved axially by a cable connected at one end to a step by step feed drum and connected at its other end to a takeup spring, said cable being formed into a U-shaped loop around a movable pulley, and said movable pulley being connected to said coupling pulley for movement thereby.

31. A printer as defined in claim 12 in which the type body is a cylinder, and in which there is a first pair of selector levers for rotary character selection and a second pair of said selector levers for axial character selection, the first pair being disposed side by said pointing in one direction, and the second pair being disposed side by side and pointing in opposite direction, the motor means being a shaft disposed between the pairs of levers and carrying two cams oriented 180° apart, one cam being connected to drive one lever of each pair and the other cam being connected to drive the other lever of each pair, the cable and pulley system for each pair including a U-shaped loop of cable around a coupling pulley with one end connected to one lever and the other end connected to the other lever of each pair of levers, the coupling pulley of one pair being connected to rotate a splined shaft on which the type body is axially slidable, the type body being moved axially by a cable connected at one end to a step by step feed drum and connected at its other end to a takeup spring, said cable being formed into a U-shaped loop around a movable pulley, and said movable pulley being connected to said coupling pulley for movement thereby.

References Cited by the Examiner

UNITED STATES PATENTS

| | | | |
|---|---|---|---|
| 610,488 | 9/1898 | Hugus | 74—40 |
| 789,018 | 5/1905 | Green | 74—522 |
| 1,271,568 | 7/1918 | Hall | 74—522 |
| 2,680,970 | 6/1954 | Durkee | 74—96 |
| 2,946,243 | 7/1960 | Gothe | 74—40 X |

ROBERT E. PULFREY, *Primary Examiner.*